US009923849B2

United States Patent
Govande et al.

(10) Patent No.: US 9,923,849 B2
(45) Date of Patent: Mar. 20, 2018

(54) SYSTEM AND METHOD FOR SUGGESTING A PHRASE BASED ON A CONTEXT

(71) Applicant: eBay Inc., San Jose, CA (US)

(72) Inventors: Shailesh Dinkar Govande, Santa Clara, CA (US); Madhura P. Tipnis, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 466 days.

(21) Appl. No.: 13/890,600

(22) Filed: May 9, 2013

(65) Prior Publication Data

US 2014/0337438 A1 Nov. 13, 2014

(51) Int. Cl.
*G06F 15/16* (2006.01)
*H04L 12/58* (2006.01)

(52) U.S. Cl.
CPC .................................. *H04L 51/063* (2013.01)

(58) Field of Classification Search
USPC ........................................................ 709/206
See application file for complete search history.

(56) References Cited

U.S. PATENT DOCUMENTS

| | | | |
|---|---|---|---|
| 7,584,426 B2 * | 9/2009 | Chang | G06Q 10/107 715/256 |
| 7,679,534 B2 | 3/2010 | Kay | |
| 2005/0017954 A1 * | 1/2005 | Kay | G06F 3/0233 345/169 |
| 2010/0161733 A1 * | 6/2010 | Bower | G06F 3/0237 709/206 |
| 2011/0197128 A1 * | 8/2011 | Assadollahi | G06F 3/0237 715/259 |
| 2014/0032206 A1 * | 1/2014 | Grieves | G06F 3/0237 704/9 |
| 2014/0163954 A1 * | 6/2014 | Joshi | G06F 17/276 704/9 |
| 2015/0019665 A1 * | 1/2015 | Linner | G06F 17/2765 709/206 |

* cited by examiner

*Primary Examiner* — Hee Soo Kim
(74) *Attorney, Agent, or Firm* — Schwegman Lundberg & Woessner, P.A.

(57) ABSTRACT

A method and a system to suggest a content item to be included in a message based on a determined context are provided. A context of a message that user is composing via a composition interface is determined based on one or more properties of the message. One or more inputs to the user composition interface are identified, the one or more inputs indicating at least a portion of intended content of the message. One or more suggested content items are provided for inclusion in the message based on the context of the message and the one or more inputs. A suggested content item of the suggested content items are added in the message based at least in part on the one or more properties of the message.

18 Claims, 9 Drawing Sheets

SYSTEM AND METHOD FOR SUGGESTING A PHRASE BASED ON A CONTEXT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to the technical field of networked communications and, in one specific example, to suggest a phrase based on a determined context.

BACKGROUND

A system may provide a suggested spelling of a word to a user composing text. The suggested spelling may be selected by the user to replace words in the text. Alternatively, the suggested spelling may not be selected and user provided spelling is not changed. The user may compose the text via a composition interface provided by a mobile device.

BRIEF DESCRIPTION OF THE DRAWINGS

Some embodiments are illustrated by way of example and not limitation in the figures of the accompanying drawings in which.

DETAILED DESCRIPTION

Example methods and systems to suggest a phrase based on a determined context are described. In the following description, for purposes of explanation, numerous specific details are set forth in order to provide a thorough understanding of example embodiments. It will be evident, however, to one skilled in the art that the present invention may be practiced without these specific details.

When a user is composing a message on a mobile device, the user is implicitly recognizing a larger context of the message that is indicative of some aspect of the user's social or professional life. For example, the user may be writing the message to family, friends, professional colleagues, co-workers, bosses, or other audience. In various embodiments, the context of the message may determine the content of the message, such as word choice, expressions used, the recipients of the message, a time of day that the message is sent, a location from which the message is sent, an application used to generate and send the message, and other choices made by the user about the message.

Many of these properties are implicitly determined by the user while composing the message. Systems and methods described herein automatically identify the context of the message at the composition stage and suggest content, recipients, or other elements to include in the message. The system uses the identified context of the message to make suggestions that are appropriate to the context.

Based on the context of the message being composed and inputs received from the user, a suggested content for the message may be provided to the user. The user may confirm that the suggested content be added to the message being composed. In an alternate embodiment, the suggested content is added to the message automatically without user confirmation. The user may also provide rules used to further suggest inputs for the message.

Figure 1:
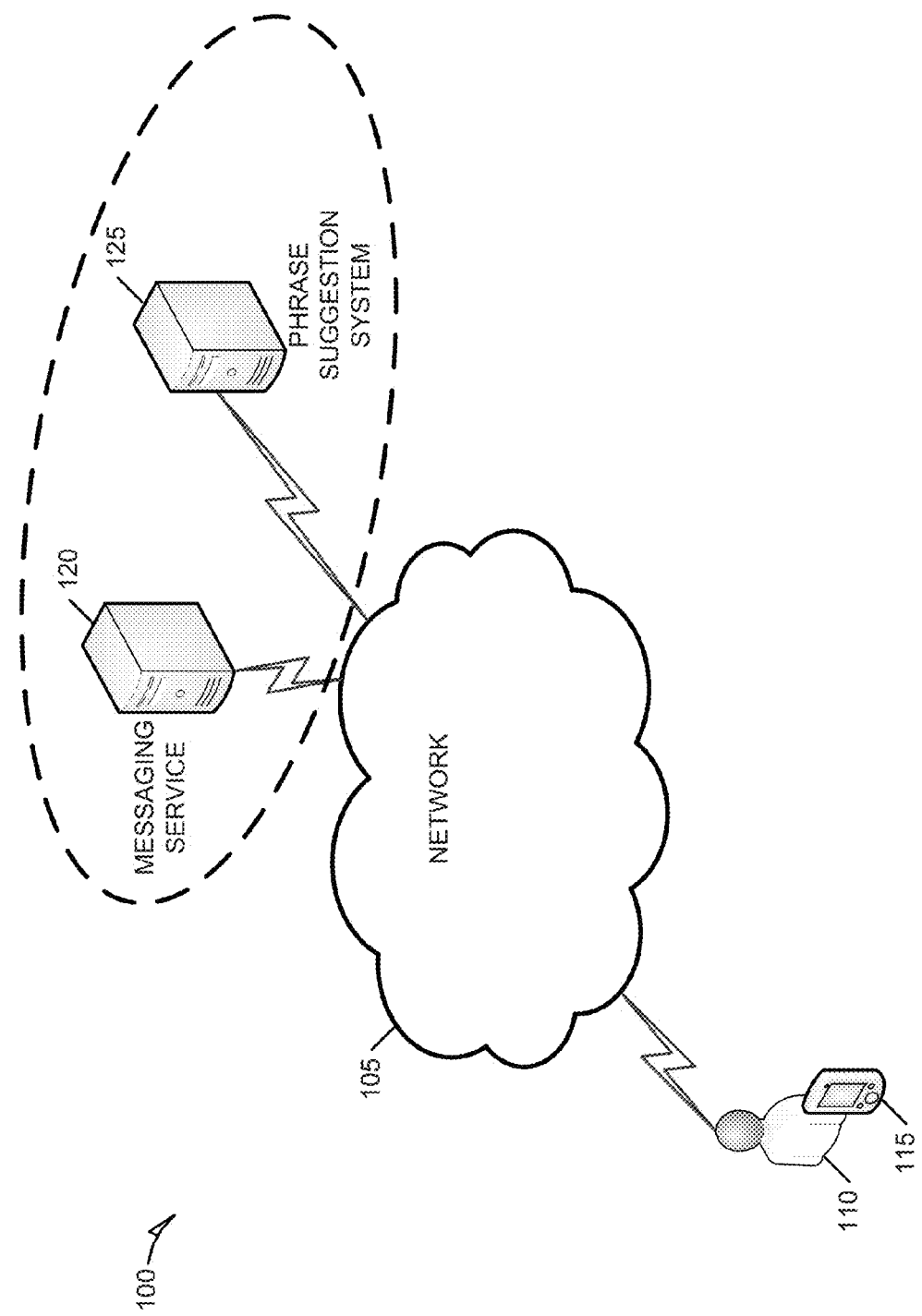
FIG. 1 is an example network diagram of an environment where various embodiments may be implemented.

FIG. 1 is an example network diagram of an environment where various embodiments may be implemented. The environment 100 may include a user 110, a messaging service 120, and a phrase suggestion system 125. In an example embodiment, the user 110 may connect to the messaging service 120 via a mobile device 115 (e.g., smart phone, PDA, laptop, or similar mobile electronic device capable of some form of data connectivity) in communication with a network 105 (e.g., the Internet, Wide Area Network (WAN), and the like). In various embodiments, the messaging service 120 includes an email application, an instant messaging application, a text messaging service, a social network application, and the like. In various embodiments, the messaging service 120 is accessible to a plurality of users. The user 110 may use the mobile device 115 to interact with the messaging service 120 and send a message to a second user connected to the messaging service 120. The user 110 may access more than one messaging service 120 using the mobile device 115.

In an example embodiment, the mobile device 115 may connect to the phrase suggestion system 125 in connection with the network 105. Further, while the environment 100 shown in FIG. 1 depicts the phrase suggestion system 125 and the messaging service 120 as two separate entities, the two may exist together. In various embodiments, the phrase suggestion system 125 interacts with the mobile device 115 and the messaging service 120 via the network 105. In an example embodiment, the user 110 may provide an input to the messaging service 120 via the network 105. The phrase suggestion system 125 identifies the input to the messaging service 120 and in response, provides suggested content. The suggested content may be sent to the user 110 to be displayed in the mobile device 115 via the network 105.

In various embodiments, a web client (e.g., a browser) executes on the mobile device 115. The web client accesses the messaging service 120 and phrase suggestion system 125 via a web interface supported by a web server. In various embodiments, a programmatic client executes on the mobile device 115. The programmatic client accesses the messaging service 120 and phrase suggestion system 125 via the programmatic interface provided by an API server.

Further, while the environment 100 shown in FIG. 1 employs a client-server architecture, the present invention is of course not limited to such an architecture, and could equally well find application in a distributed, or peer-to-peer, architecture system, for example. The messaging service 120 and phrase suggestion system 125 could also be implemented as standalone software programs, which do not necessarily have networking capabilities.

Figure 2:
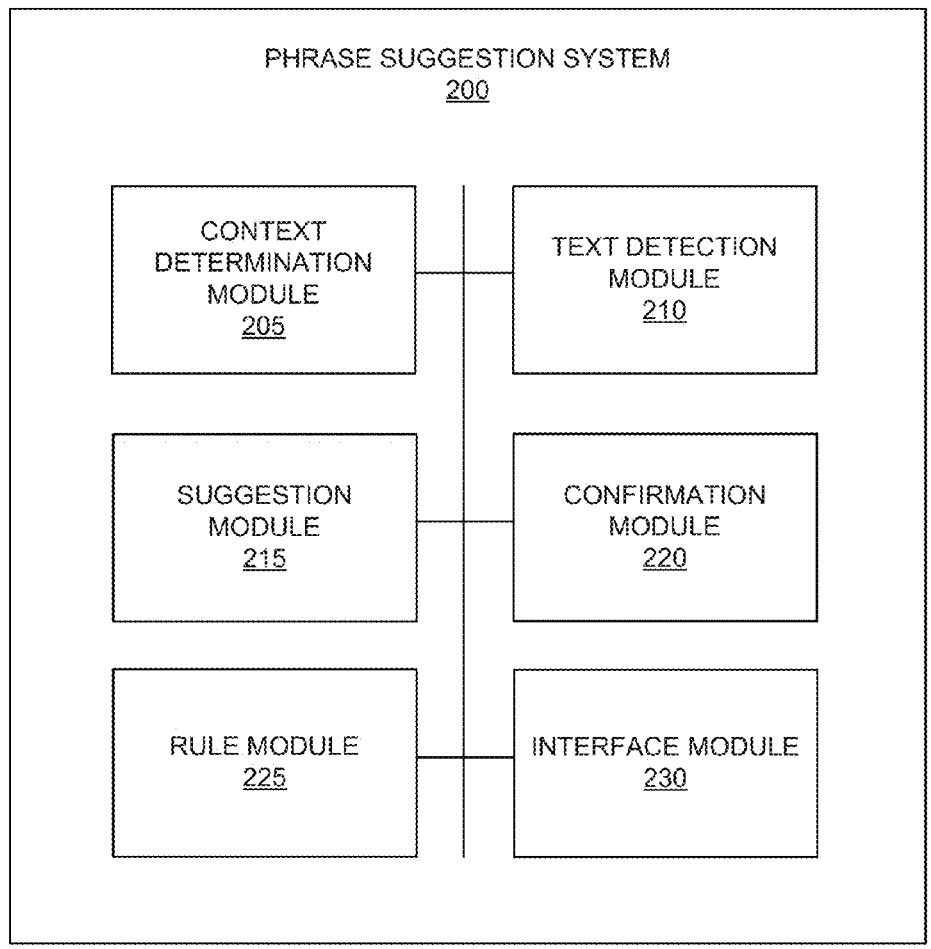
FIG. 2 is a block diagram of a phrase suggestion system, according to various embodiments.

FIG. 2 is a block diagram of a phrase suggestion system 200, according to various embodiments. The phrase suggestion system includes a context determination module 205, a text detection module 210, a suggestion module 215, a confirmation module 220, a rule module 225, and an interface module 230. As indicated in FIG. 1, the phrase suggestion system 200 may reside at a server and be accessible to the user via the network 105. Alternatively, the phrase suggestion system 200 may reside at least in part at the mobile device 115.

A message being composed may have one or more properties indicating factors involved in the composition of the message. In various embodiments, the properties of the message include a parent message—a previous message that was sent to the user and where the message being composed is a response to the previous message. Alternatively, the parent message may be one message of a plurality of previous messages exchanged between the user and at least one other user.

In various embodiments, the properties of the message further include at least one keyword in the message or in a parent message. For instance, the keyword may be a word or phrase that indicates a topic of the message. The keyword may be found in the subject line of an email, may be a recipient of the message, may be an expression repeated in the message, and the like. The topic of the message indicated by the keyword may be used to determine a context of the message. In various embodiments, the message includes a plurality of topics, each of which are indicated by a respective keyword. In various embodiments, the keyword may indicate one or more contexts of the message. In an example embodiment, a message may include several keywords pertaining to cars, cities, and the term "Bay Area". From these keywords, the context of the message may be determined to be, for example, one or more of driving in San Francisco, buying a car in San Francisco, or selling a car in San Jose.

In various embodiments, the properties of the message include at least one recipient of the message. The at least one recipient of the message may be identified as indicative of the message being written within one or more contexts defined by or for the user. To illustrate, certain recipients may be identified as family members of the user, co-workers of the user, or friends of the user and assigned to the corresponding context. Based on these identifications, the context of the message is determined as the context in which at least a portion of the recipients are assigned. If the message is addressed to recipients assigned to more than one context, the context may be determined based on the context to which a majority of the addressed members are assigned. For example, if the message is addressed to the user's mother, father, but also to the user's boss, the context of the message may be determined to be personal based on the mother and father indicated as recipients. In this situation, the context may be determined to be personal because although the user's boss is indicated as a recipient, a majority portion of the recipients belong in the personal context. Alternatively, the context of the message may be determined to be professional based on the user's boss indicated as a recipient. In various embodiments, the user may define a rule indicating that when a message that includes the user's boss as a recipient, the context is automatically determined to be work-related even if a majority portion of the recipients indicate a different context.

In various embodiments, the properties of the message include an account used to compose the message. The account being used to generate the message may be used in determining the context of the message. An account being used for personal purposes may be used in determining that the context of the message is personal. For instance, a message being composed with the user's personal Gmail™ account may be determined to be in the personal context. Alternatively, a message being composed by the user in the user's Outlook™ account for work may be determined to be in the professional context. In various embodiments, the account corresponds to the messaging service 125 depicted in FIG. 1. The account may be an email account, an instant messaging account, a social network account, a phone number for the mobile device 115, and the like. The account being used to compose the message may be accessed by the mobile device 115 or any other device that is able to access the messaging service 125 via the network 105.

In various embodiments, the properties of the message may include a human-readable language used in the message being composed. The human-readable language used in the message may indicate the user's proficiency of that language. In various embodiments, the user's proficiency of the human-readable language is determined based on the number of words or phrases written in that language. Further, more than one human-readable language may be used in the message being composed. For example, if the message is being written in both English and Chinese, the user's proficiency in each language may be determined. If a majority of the expressions in the message are written in Chinese, the system may determine that the user is more proficient in Chinese and less proficient in English. The system may also look to previous messages composed by the user to determine the user's proficiency in a particular human-readable language. The user's proficiency of the human-readable language may be used in determining the context of the message and in providing suggested content to the user. For instance, if a user is more proficient in English, then suggested content provided to the user may also be in English.

In various embodiments, the properties of the message include a geographical location of the user 110. The geographical location of the user 110 may be indicated by the mobile device 115 using a GPS receiver and may correspond to a location on a map, such as Google Maps™. In various embodiments, the geographical location of the user 110 is determined by the one or more keywords used in the message or the parent message. For example, if the expression "San Francisco" is repeated in a chain of emails between the user and a friend of the user, it may be determined that the user is currently in San Francisco. In various embodiments, the geographical location of the user is determined by the account being used to generate the message in which the user has indicated a location as part of the account settings. The geographical location of the user may be used in determining the context of the message and providing suggested content to the user. For instance, if the user is in San Francisco, suggested content describing locations in San Francisco may be provided to the user as the user is composing the message.

In various embodiments, the properties of the message include a change of the geographical location of the user 110. The change of the geographical location may be measured at various intervals to indicate a rate of change of the geographical location. The rate of change indicates a velocity at which the user is traveling. For instance, the rate of change of the geographical location of the user may be determined to be at 60 miles per hour by tracking the speed at which the geographical location of the user is moving on a map. This rate of change, along with location data indicating that the user is located on a freeway at both points in time, indicates that the user is in a car, either as a driver or passenger. Alternatively, the rate of change may be determined to be at 3 miles per hour and the location of the user may be determined to be at a park as indicated by the map. Based on this information, the user may be determined to be walking at a park. In either situation, the confirmation module 220 may use this information when adding the suggested content items to the message being composed.

In various embodiments, the properties of the message include calendar data of the user. The calendar data may be accessed from an account belonging to the user being used to compose the message. For example, the user's personal email account may have a built in calendar referenced by the user. The calendar data may indicate events that the user is participating in. Further the events indicated may include events that have already occurred and events in the future that the user will participate in. The calendar data may indicate times at which the user will be participating in the events. The calendar data may also indicate other people participating in the events. In various embodiments, the message being composed relates to an event indicated by the calendar data and the calendar data may be used to determine the context of the message. For instance, the message being composed pertains to an event indicated by the user's calendar data, such as a friend's birthday party, a family member's graduation, a work meeting, and the like.

The user may compose the message via a composition interface. In various embodiments, the composition interface exists as part of the account being used to compose the message. For instance, the composition interface is the email interface provided by the user's Gmail™ account. Alternatively, the composition interface is a text messaging interface to send and receive text messages using the user's phone number. Further, the composition interface may be provided from a device including the mobile device 115, a computer, and the like. In various embodiments, as the user is composing the message, the composition interface identifies inputs from the user that are added to the message and displays the identified inputs to the user. In this way, the composition interface displays the message to the user as it is being composed. The composition interface may also display suggested content to be added to the message from the suggestion module 215. The displayed suggested content is provided to the user as the user is composing the message.

In various embodiments, the context determination module 205 is configured to determine a context of a message that a user is composing based on the one or more properties of the message. The one or more properties of the message may indicate circumstances involved in composing the message including the choices made by the user in composing the message. The one or more properties of the message include a parent message, at least one keyword from the message being composed, at least one recipient of the message, an account being used to generate the message, a human-readable language in which the message is composed, a geographical location of the user, a change of the geographical location of the user, and calendar data of the user.

As stated previously, the context of the message may be used to evaluate the content of the message such as word choice, expressions used, the recipients of the message, a time of day that the message is sent, a location from which the message is sent, an application used to generate and send the message, and other choices made by the user about the message. Further, the context of the message may indicate words or phrases that are appropriate to the context and therefore usable for the message being composed.

In various embodiments, a context of a first message may not be the same as a context of a second message. The factors involved in generating the first message in the first context may be different from the factors involved in generating the second message in the second context. As such, the first message may be different from the second message based on word choice, expressions used, the recipients of the message, a time of day that the message is sent, a location from which the message is sent, an application used to generate and send the message, and other choices made by the user about the message. Alternatively, the factors involved in generating the first message in the first context may be similar to the factors involved in generating the second message in the second context even though the first and second contexts are different. As an example, the words and phrases that may be appropriate for a message to a friend of the user may be inappropriate for a message to the user's boss. However, words and phrases that are appropriate for a message to a friend may also be appropriate for a message to family even though the two contexts are different.

In various embodiments, the context determination module 205 may determine that the user is traveling in a motor vehicle based in part on the velocity at which the user is traveling. In various embodiments, the context determination module 205 may determine that the user is currently in San Francisco based on the geographical location of the user. In various embodiments, the context determination module 205 may determine a topic of conversation based on the parent messages prior to the message being composed. In various embodiments, the context determination module 205 may determine that the message is work related based on the recipient of the message and the account being used to compose the message. In various embodiments, the context determination module 205 may determine that the user is currently in the Bay Area based on the calendar data of the user. In various embodiments, the context determination module 205 may determine the topic of the message based on the at least one keyword from the message being composed.

In various embodiments, the text detection module 210 is configured to identify one or more inputs to the composition interface. As stated previously, the composition interface may be provided by the device or an app within the device that enables the user to compose the message. Further, the composition interface may exist as part of the account being used to compose the message. The one or more inputs to the composition interface are received from the user as the message is being composed. In various embodiments, the one or more inputs to the composition interface indicate at least a portion of intended content of the message. For instance, if the user begins the message with the words "car" and "Bay Area", the intended content of the message may be racing cars in Santa Cruz. However, in various embodiments, the intended content of the message is not the same as the actual content of the message. Therefore the one or more inputs to the composition interface indicating at least a portion of intended content are not added to the message being composed. The actual content of the message may include the suggested content items provided by the suggestion module 215. For instance, when the user inputs the words car and Bay Area to the composition interface, the word San Francisco may be provided to the user as a suggested content. The user may choose to use San Francisco instead of the word Bay Area, and thus, the actual content of the message is different than the intended content of the message. In various embodiments, the intended content of the message is used in determining the context of the message. The suggestion module 215 also uses intended content of the message in providing suggested content items.

In various embodiments, the suggestion module 215 is configured to provide one or more suggested content items for inclusion in the message based on the context of the message and the one or more inputs. The context of the message is used to determine the content of the message. The content of the message includes the word choice, spelling, expressions used, recipients of the message, time of day, location of message, an application used to generate and send the message, and the like.

Figure 7:
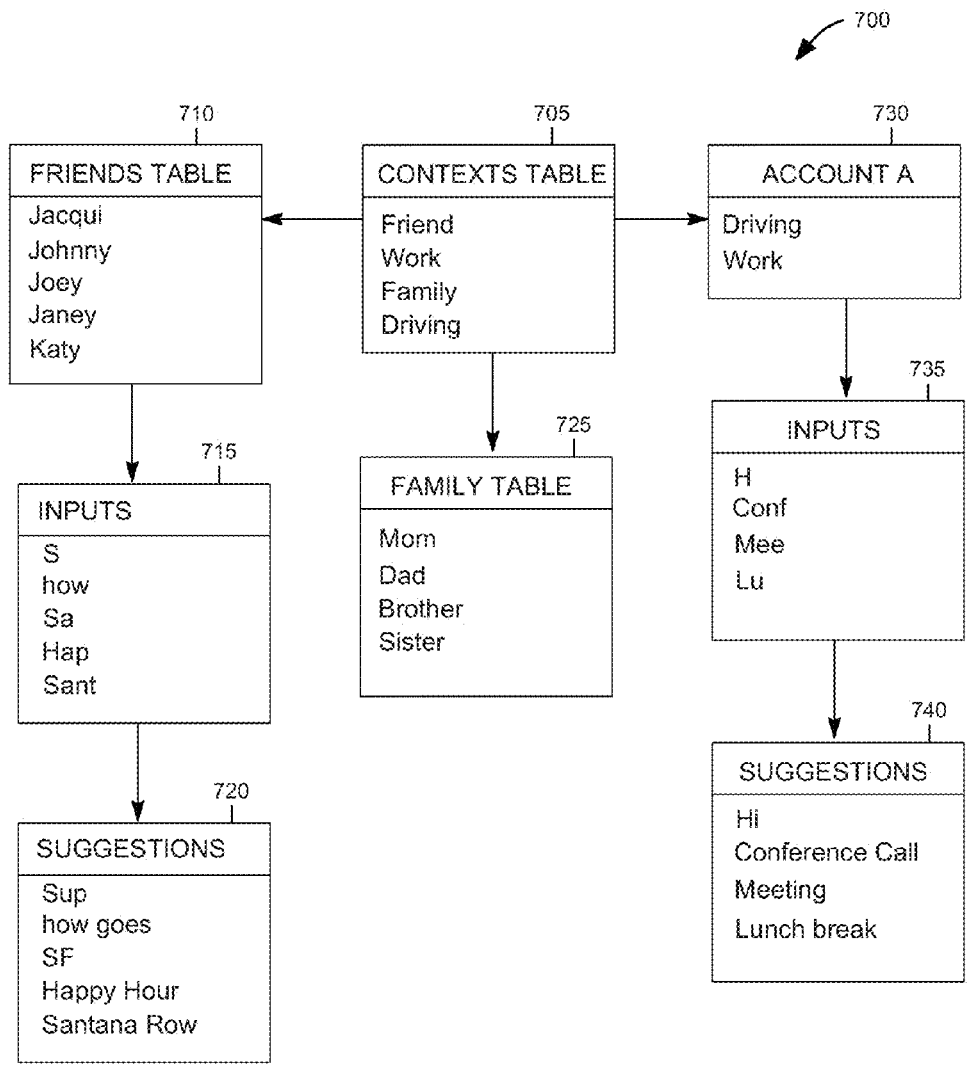
FIG. 7 is block diagram depicting tables used to provide suggested content, according to various embodiments.

In various embodiments, the context of the message is used by the suggestion module 215 to search for the one or more suggested content items from a dictionary of available content items. The dictionary of available content items may be indexed according to context. In various embodiments, the respective entries of the dictionary of available content items are a suggested content item that is retrievable from the dictionary to be provided to the user. Further, each suggested content item of the dictionary includes metadata tags indicating a context of the suggested content item. In various embodiments, the context of the message may correspond to the metadata tags of one or more entries in the dictionary. The one or more entries in the dictionary corresponding to the context of the message are retrieved and provided to the user as suggested content items. In various embodiments, the dictionary is organized into a plurality of data tables, as shown in FIG. 7 according to an example embodiment.

In various embodiments, the suggested content items provided to the user are a modification of the one or more inputs to the composition interface. Modifications include changing the spelling of a word, capitalizing characters entered by the user, and the like. The modifications are provided to the user and displayed in the composition interface as the user is composing the message. In various embodiments, the suggested content items include the one or more inputs to the composition interface. For instance, if the user is composing a sentence that is yet to be completed, the suggestion module may suggest a completed sentence including the input that the user has already provided. As another example, if the user begins typing a character in the recipient line of an email message, the suggestion module may suggest a full name of a recipient, the name including the character that the user has already provided.

In various embodiments, the suggestion module 215 may be further configured to cause the one or more suggested content items to be displayed in the composition interface via the network 105. The composition interface may be displayed on a screen of the device providing the composition interface.

In various embodiments, the confirmation module 220 is configured to add a suggested content item of the suggested content items in the message based at least in part on the one or more properties of the message. For instance, the user may be traveling in a vehicle at a high speed when the user is composing the message. This may be determined from the geographical location of the user and the rate at which the geographical location of the user is changing. Further, the user may be composing the message on the mobile device 115, indicating that the user is not at a computer. From these properties of the message, the confirmation module 220 may determine that the user is not at home but rather traveling at a high speed on a highway in a vehicle. Based on this information, the confirmation module 220 may automatically add the suggested content item in the message without human intervention. As such, if the user is replying to a message while driving, the suggestion module may automatically add the suggested content in the message without requiring any confirmation from the user. Alternatively, the one or more properties of the message may indicate that the user composing the message is at home on a computer accessing a personal email account. Based on this information, the confirmation module 220 may be configured to receive a confirmation from the user before adding the suggested content item in the message.

In various embodiments, the rule module 225 is configured to apply user-defined rules to identify the one or more suggested content items. The user-defined rules may be applied to the identified inputs from the user. The user-defined rules may indicate inputs that are inappropriate for a given context. In an example embodiment, the user-defined rules may prohibit profane language to be added in messages in a professional context. Further, the user-defined rules may correct spelling or grammar for words and phrases added in message in the professional context. The user-defined rules may further be applied to exclude an available content item from being suggested as the one or more suggested content items. In an example embodiment, the user-defined rules may specifically prohibit use of the word 'chair' in the professional context. Therefore, even if the word 'chair' is an available content item, it will not be suggested by the suggestion module 215.

Figure 3:
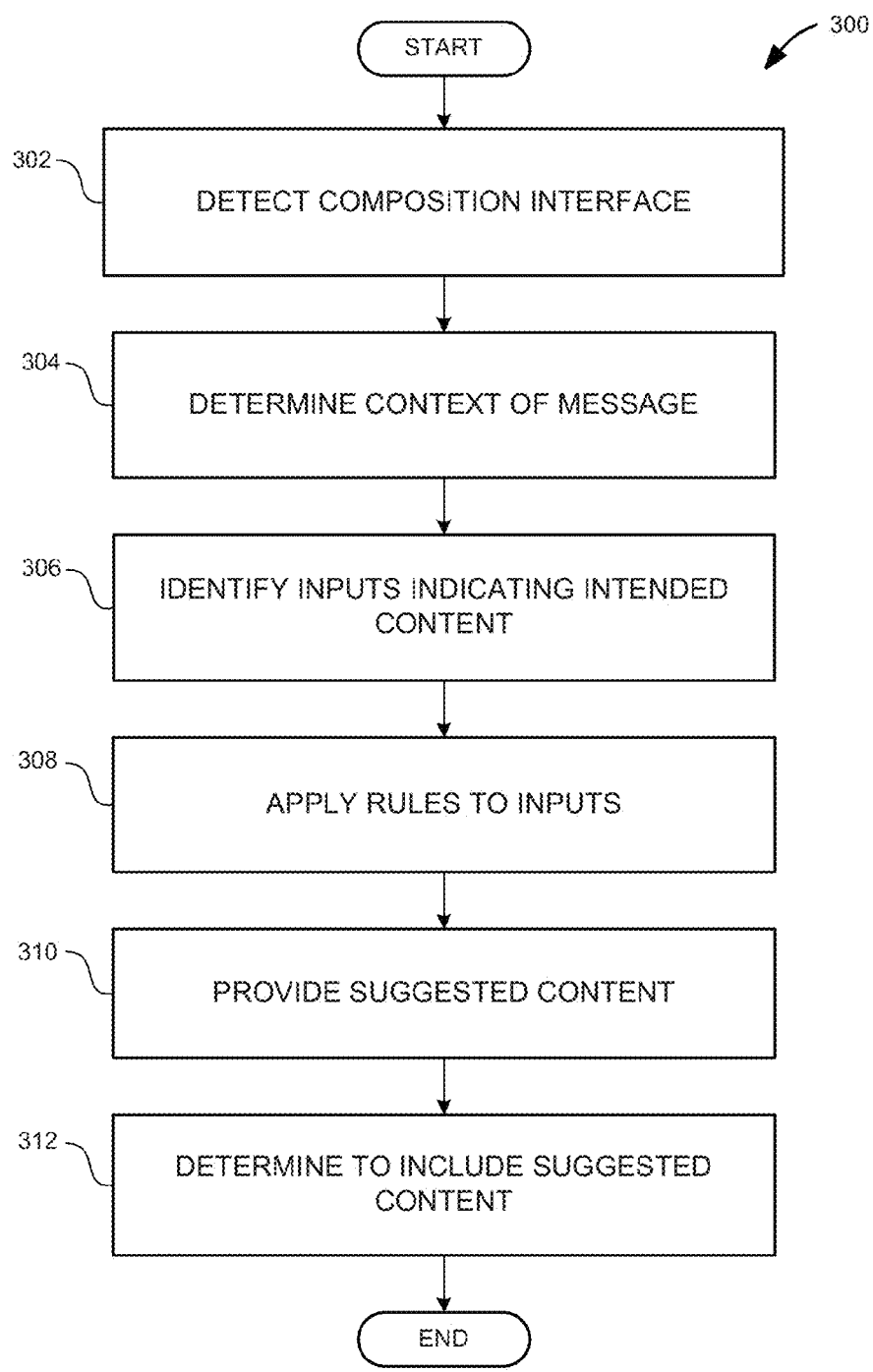
FIG. 3 is a flowchart of a method to include a suggested content within a message, according to various embodiments.

FIG. 3 is a flowchart of a method 300 to include a suggested content within a message, according to various embodiments. The method 300 begins at step 302 with detecting a composition interface being used to compose the message. The composition interface may be provided to a user from a user device, such as a mobile device 115. In various embodiments, the composition interface exists as part of an account being used to compose the message, the account being a part of a messaging service 120. Detecting the composition interface may include the phrase suggestion system 125 receiving an indication from the mobile device 115 via the network 105 that the user is composing a message via the composition the interface. Alternatively, the phrase suggestion system 125 may receive an indication from the messaging service 120 via the network 105 that the user is composing a message using the messaging service 120. In various embodiments, the composition interface is detected using the interface module 230.

At step 304 the method 300 determines the context of the message. In various embodiments, the context is determined using the context determination module 205 based on one or more properties of the message. At step 306, the text detection module 210 identifies one or more inputs to the user composition interface. In various embodiments, the one or more inputs indicate at least a portion of intended content of the message. At step 308, the rule module 225 applies user-defined rules to the one or more inputs in order to identify one or more suggested content items. At step 310, the suggestion module 215 provides the one or more suggested content items to the user via the composition interface, the suggested content items being used for inclusion in the message. At step, 312 the confirmation module 220 determines whether to include the suggested content items in the message being composed. In various embodiments, the determination is based at least in part on the one or more properties of the message. In various embodiments, the determination is also based at least in part on a confirmation received from the user composing the message to include the suggested content items in the message.

Figure 4:
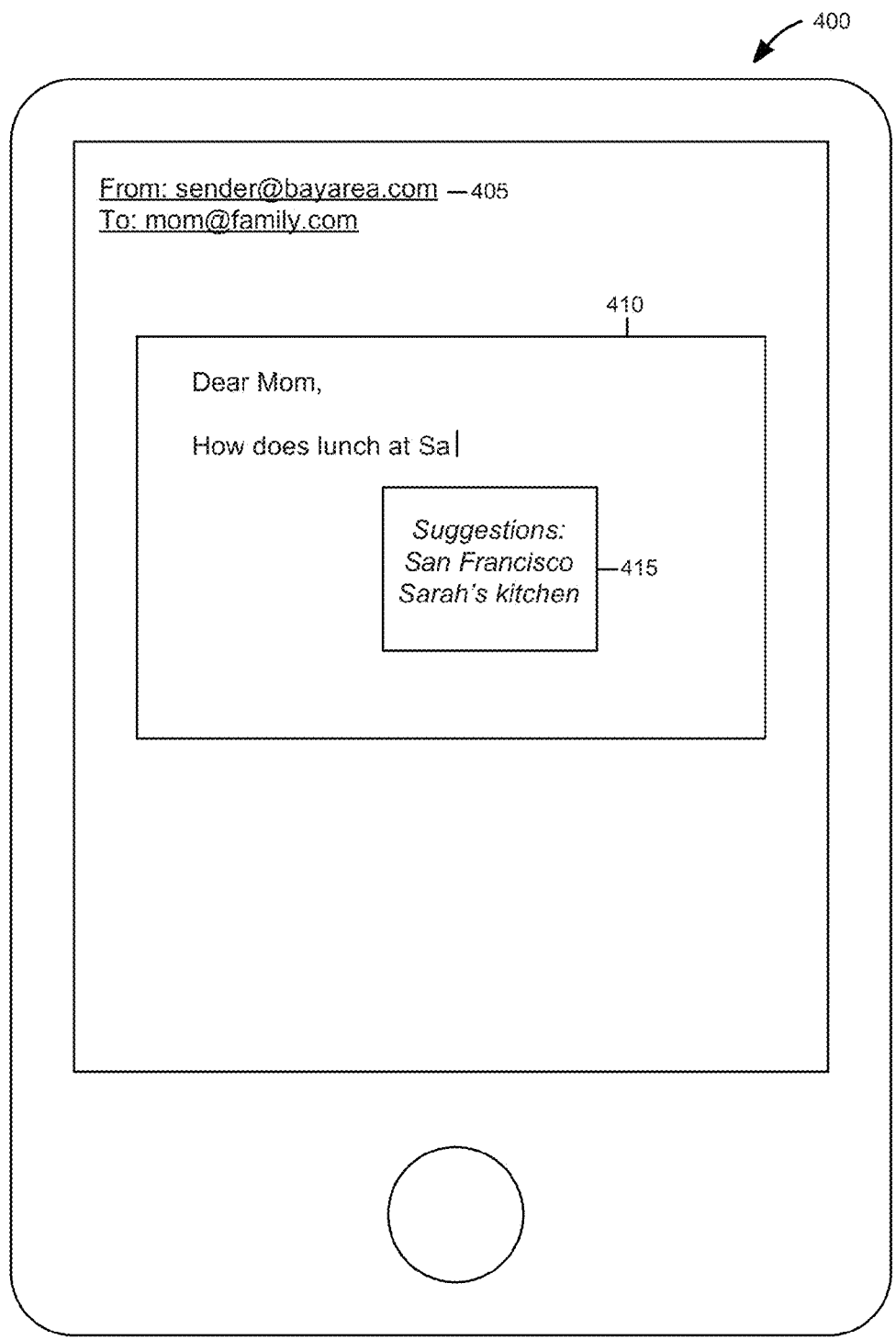
FIG. 4 is a portion of a user interface depicting suggested content for a message being composed, according to various embodiments.

FIG. 4 is a portion of a user interface 400 depicting suggested content for a message being composed, according to various embodiments. In various embodiments, the account 405 being used to compose the message is displayed in the user interface 400 as well as the recipient of the message. The user composition interface 410 exists as a portion of the user interface 400 and indicates an area where the message is being composed. The context determination module 205 may determine that context of the message is a message to a family member located in the Bay Area based at least in part on the account 405 being used to compose the message and based at least in part on the recipient of the message. Further, suggested content items 415 are presented to the user as the user is composing the message via the user composition interface 410. As depicted in FIG. 4, when the user begins typing 'Sa', suggested content items including San Francisco and Sarah's Kitchen are presented to the user as suggested content items 415. The suggested content items 415 may be presented to the user based on the determined context of the message, in particular, that the message is a message to a family member.

Figure 5:
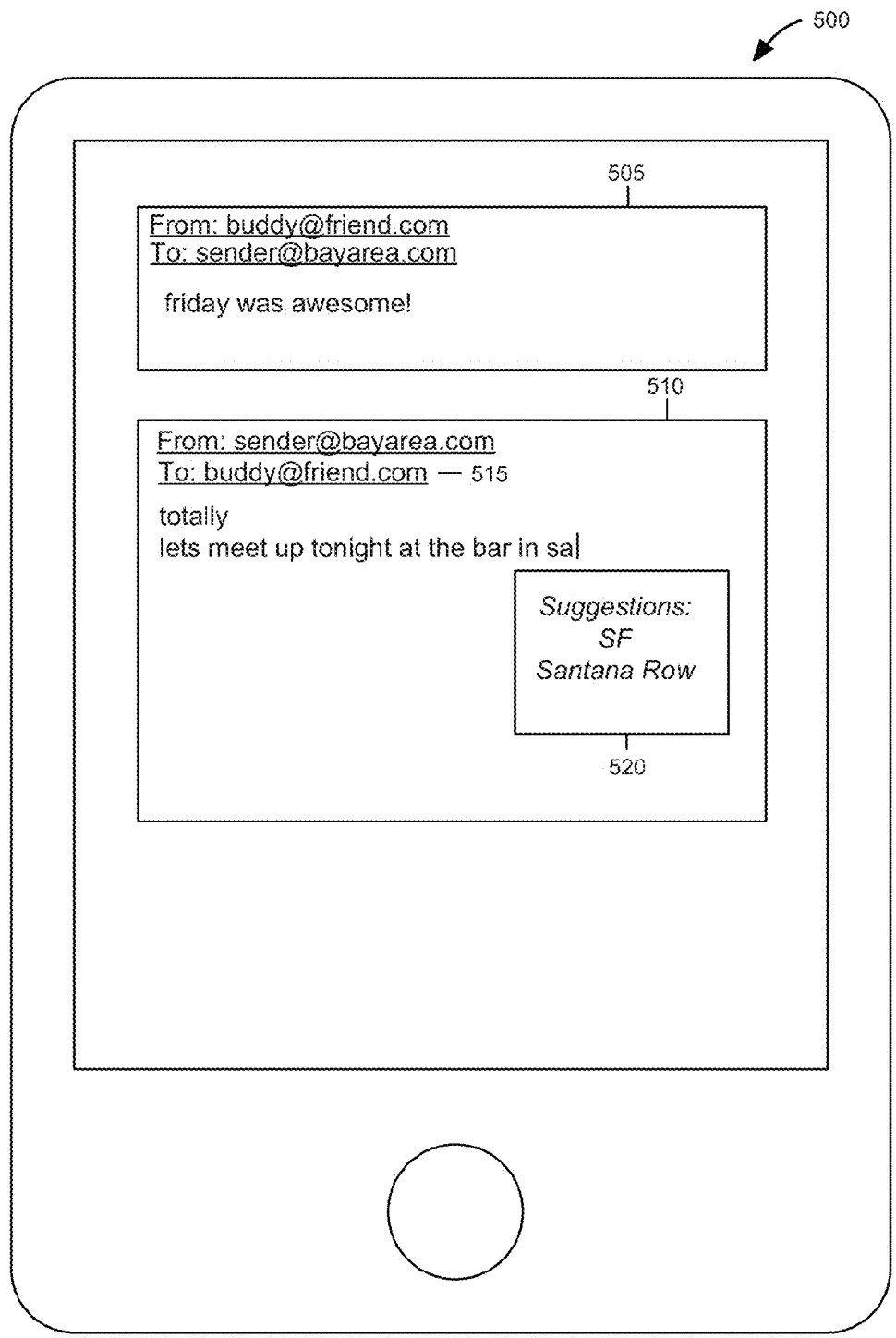
FIG. 5 is a portion of a user interface depicting suggested content for a reply message being composed, according to various embodiments.

FIG. 5 is a portion of a user interface 500 depicting suggested content for a reply message being composed, according to various embodiments. The previous message 505 is displayed in the upper portion of the user interface 500. The reply message to the previous message 505 is composed within an area of a user composition interface 510 that is located below the previous message 505. The context determination module 205 may determine that the context of the message is a casual reply message to a friend based on the previous message 505 received by the user and also based on the recipient 515 of the message being composed. As depicted in FIG. 5, when the user begins typing 'sa', suggested content items including SF and Santana Row are presented to the user as suggested content items 520. The suggested content items 520 may be presented to the user based on the determined context of the message, in particular, that the message is a message to a friend.

Figure 6:
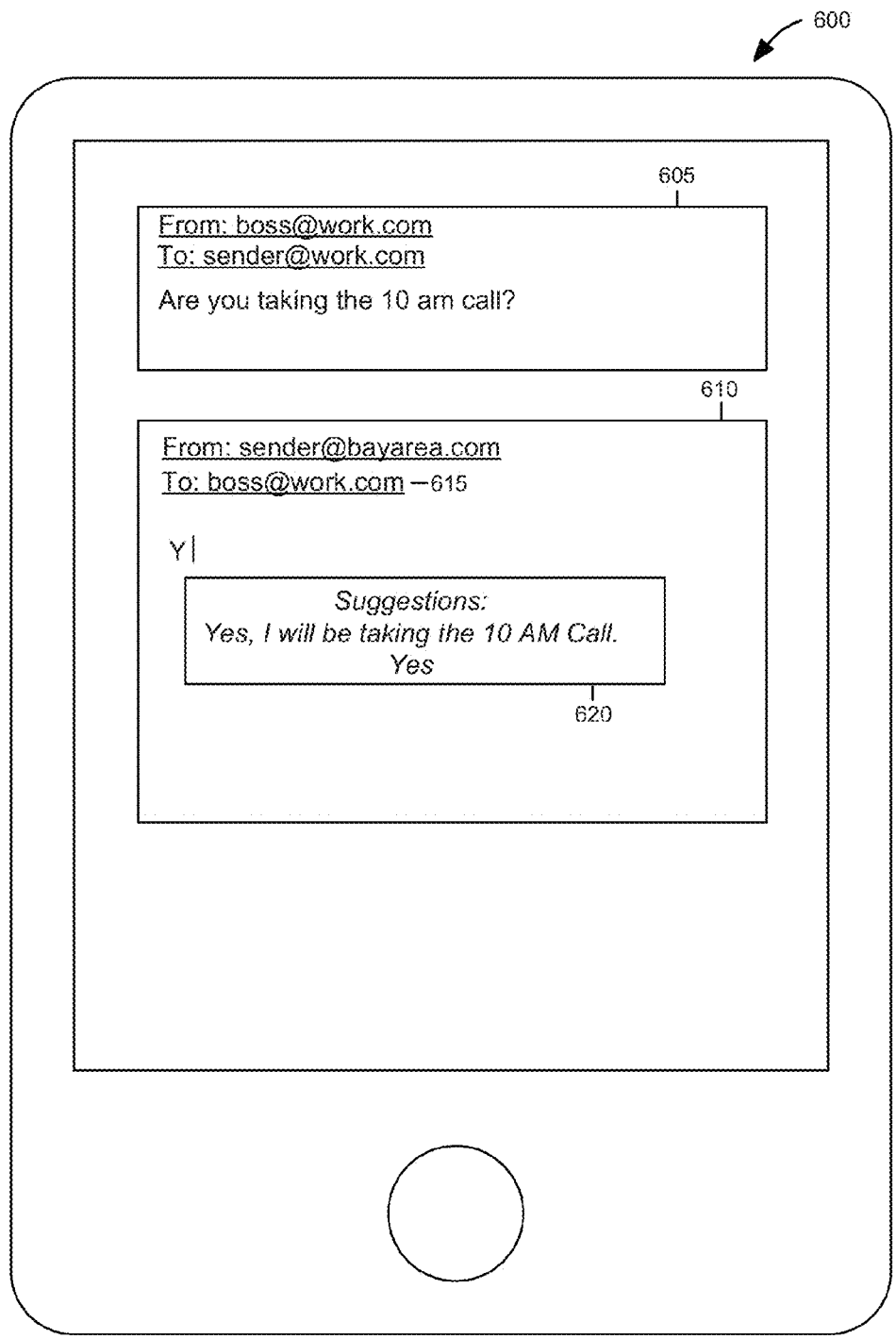
FIG. 6 is a portion of a user interface depicting suggested content for a reply message being composed, according to various embodiments.

FIG. 6 is a portion of a user interface 600 depicting suggested content for a reply message being composed, according to various embodiments. The previous message 605 is displayed in the upper portion of the user interface 600. The reply message to the previous message 605 is composed within an area of a user composition interface 610 that is located below the previous message 605. The context determination module 205 may determine that the context of the message is a work related message to the user's boss based on the previous message 605 received by the user and also based on the recipient 615 of the message being composed. As depicted in FIG. 6, when the user begins typing 'Y', suggested content items including 'Yes, I will be taking the 10 AM Call' and 'Yes' are presented to the user as suggested content items 620. These suggested content items 620 are determined based on the context of the message, in particular, that the message is a reply to a message about a morning phone call. The suggested content items 620 displayed to the user are selectable by the user to be included in the message.

FIG. 7 is block diagram depicting tables used to provide suggested content, according to various embodiments. The tables depicted may be maintained within a database used to support the phrase suggestion system. A "contexts" table 705 includes a list of contexts which may be used in determining a context of a message being composed. For instance, the context of the message may be determined to be one of the contexts from the list of contexts, such as a message to a friend, a message to a co-worker, a message to a family member, or a message composed while driving. Linked to the "contexts" table 705 is a "friends" table 710 which includes a list of friends of the user. In various embodiments, the context of the message is determined to be a message to a friend based on the recipient being one of the friends listed in the "friends" table 710. Linked to the "friends" table 710 is an "inputs" table 715 that includes a plurality of inputs that may be received from the user when composing a message to a friend via the composition interface. In various embodiments, each input in the "inputs" table 715 has a corresponding suggested content item included within a "suggestions" table 720. For example, if the input from the user is identified to be "S" and the message is being composed to a friend of the user, then the corresponding suggested content item from the "suggestions" table 720 is "Sup" and is presented to the user as the suggested content item. Linked to the "contexts" table 705 is a "family" table which may include a list of family members of the user. In various embodiments, the context of the message is determined to be a message to a family member based on the recipient being one of the family members listed in the "family" table 725. Also depicted in FIG. 7 is an "account A" table 730 that includes a list of contexts. The "account A" table 730 may correspond to a user account that is being used to generate the message. The list of contexts included in the "account A" table 730 indicates at least one possible context for the message being composed using account A. For example, account A may be the user's work email account and may be determined to be used when the user is composing a work related message or when the user is driving, as depicted in the "account A" table 730. Linked to the "accounts A" table 730 is an "inputs" table 735 that includes a plurality of inputs that may be received from the user composing a message using account A. Linked to the "inputs" table 735 is a "suggestions" table 740. In various embodiments, each input in the "inputs" table 735 has a corresponding suggested content item included within a "suggestions" table 740. When an input is received from the user, a suggested content item from the "suggestions" table 740 is presented to the user.

Figure 8:
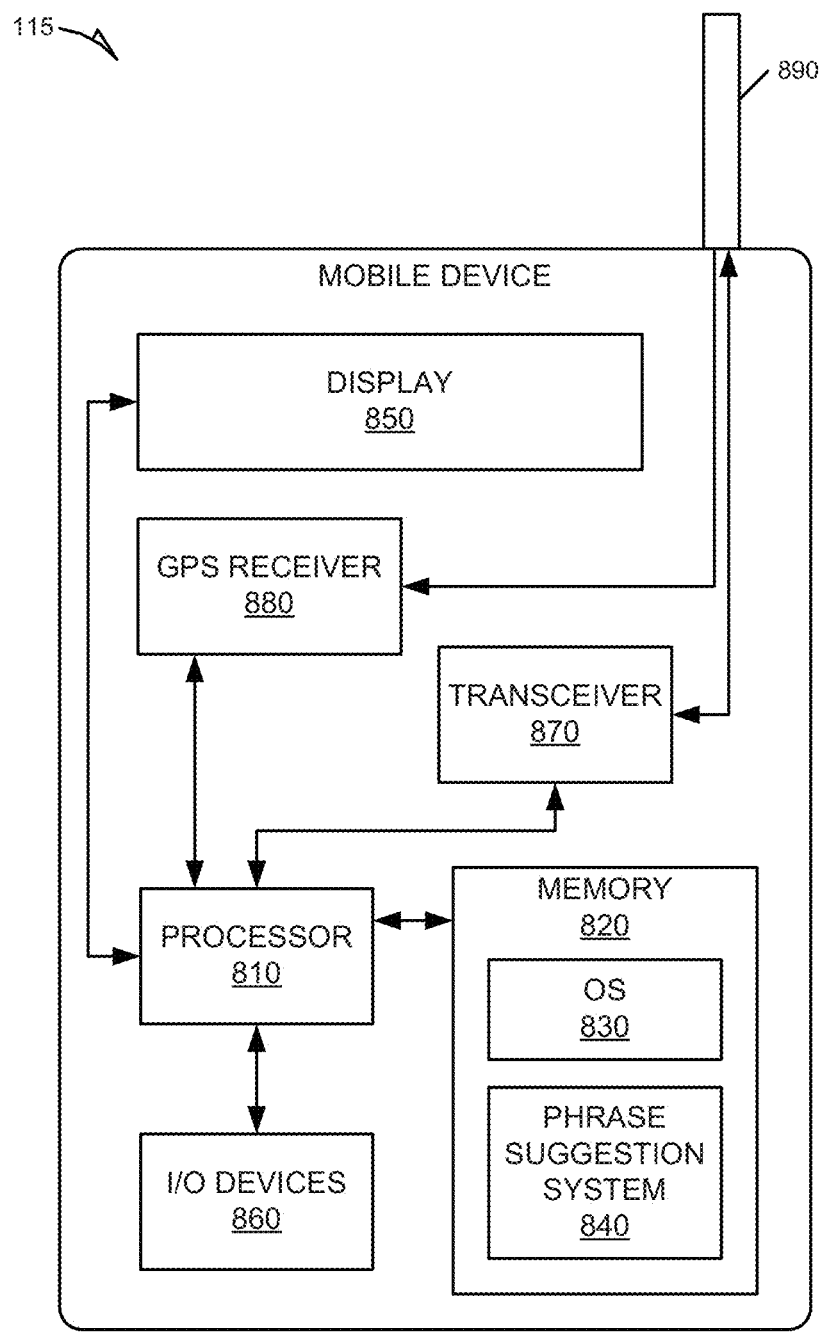
FIG. 8 is a block diagram depicting a mobile device, according to various embodiments.

FIG. 8 is a block diagram depicting a mobile device, according to various embodiments. The mobile device 115 may include a processor 810. The processor 810 may be any of a variety of different types of commercially available processors suitable for mobile devices (for example, an XScale architecture microprocessor, a Microprocessor without Interlocked Pipeline Stages (MIPS) architecture processor, or another type of processor). A memory 820, such as a Random Access Memory (RAM), a Flash memory, or other type of memory, is typically accessible to the processor. The memory 820 may be adapted to store an operating system (OS) 830, as well as application programs such as a phrase suggestion system 840 to provide suggested content to the user composing a message using the mobile device. The processor 810 may be coupled, either directly or via appropriate intermediary hardware, to a display 850 and to one or more input/output (I/O) devices 860, such as a keypad, a touch panel sensor, a microphone, and the like. Similarly, in some embodiments, the processor 810 may be coupled to a transceiver 870 that interfaces with an antenna 890. The transceiver 870 may be configured to both transmit and receive cellular network signals, wireless data signals, or other types of signals via the antenna 890, depending on the nature of the mobile device 115. In this manner, the mobile device 115 may connect to the messaging service 120 and the phrase suggestion system 125 via the network 105. Further, in some configurations, a GPS receiver 880 may also make use of the antenna 890 to send and receive GPS signals used to determine a location of the mobile device 115. The location of the mobile device 115 may be used in determining a context of a message being composed by a user using the mobile device 115. Moreover, a change in the location of the mobile device 115 may also be used in determining the context of the message being composed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
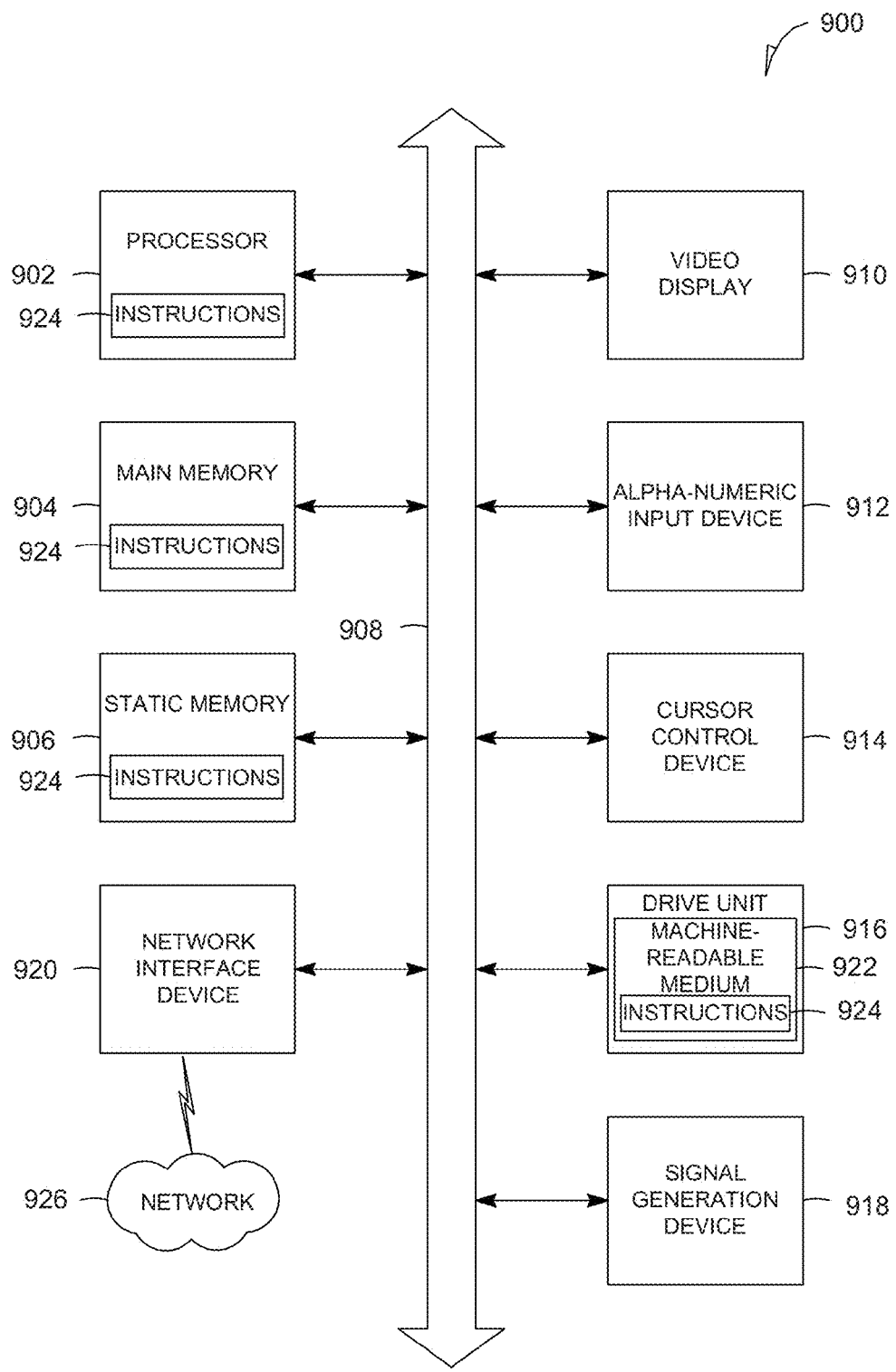
FIG. 9 is a diagrammatic representation of machine in the example form of a computer system within which a set of instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    one or more processors and executable instructions accessible on a computer-readable medium that, when executed, cause the one or more processors to perform operations comprising:
    determining a context of a message that a user is composing via a composition interface based on one or more properties of the message, the one or more properties including a geographical location of the user composing the message;
    identifying one or more inputs to the composition interface, the one or more inputs indicating in part the geographical location of the user composing the message, the context of the message being determined further based on the one or more inputs;
    examining one or more prior messages composed by the user to determine proficiency of the user in a human-readable language;
    retrieving, based on the determined proficiency, one or more suggested content items in the human-readable language from a dictionary including a table that links the one or more inputs to the one or more suggested content items, the dictionary being indexed by context and the retrieving including matching the context of the message to a context indexed in the dictionary;
    causing display of one or more suggested content items for inclusion in the message based on the context of the message, the suggested content items being phrases related to the geographical location of the user composing the message; and
    adding a phrase related to the geographical location of the user in the message based at least in part on the one or more properties of the message.

2. The system of claim 1, wherein the operations further comprise:
    applying user-defined rules to identify the one or more suggested content items; and
    causing the one or more suggested content items to be displayed in the composition interface.

3. The system of claim 2, wherein the operations further comprise:
    applying the user-defined rules to exclude an available content item from the one or more suggested content items.

4. The system of claim 1, wherein the one or more properties of the message include:
    a parent message, at least one keyword from the message being composed, at least one recipient of the message, an account being used to generate the message, a human-readable language in which the message is composed, a change of the geographical location of the user, or calendar data of the user.

5. The system of claim 1, wherein the operations further comprise refraining from adding a suggestion content item of the one or more suggested content items to the message.

6. The system of claim 1, wherein the dictionary is a database indexed according to context.

7. The system of claim 1, wherein respective entries of the dictionary are a suggested content item of the one or more available content items and wherein the respective entries include one or more metadata tags, the one or more metadata tags each indicating a context of the suggested content item.

8. The system of claim 1, wherein the operations further comprise determining the context based in part on the one or more inputs.

9. The system of claim 1, wherein the one or more suggested content items includes the one or more inputs indicating at least a portion of the intended content of the message.

10. The system of claim 1, wherein the one or more suggested content items is a modification of the one or more inputs indicating at least a portion of the intended content of the message.

11. The system of claim 1, wherein the operations further comprise receiving a confirmation from the user to add the suggested content item in the message.

12. The system of claim 1, wherein the operations further comprise automatically adding the suggested content item in the message.

13. A method comprising:
    determining a context of a message that a user is composing via a composition interface based on one or more properties of the message, the one or more properties including a geographical location of the user composing the message;
    identifying one or more inputs to the composition interface, the one or more inputs indicating in part the geographical location of the user composing the message, the context of the message being determined further based on the one or more inputs;
    examining one or more prior messages composed by the user to determine proficiency of the user in a human-readable language;
    retrieving, based on the determined proficiency, one or more suggested content items in the human-readable language from a dictionary including a table that links the one or more inputs to the one or more suggested content items, the dictionary being indexed by context and the retrieving including matching the context of the message to a context indexed in the dictionary;
    causing display of, using one or more processors, one or more suggested content items for inclusion in the message based on the context of the message, the suggested content items being phrases related to the geographical location of the user composing the message; and
    adding a phrase related to the geographical location of the user in the message based at least in part on the one or more properties of the message.

14. The method of claim 13, further comprising:
    applying user-defined rules to identify the one or more suggested content items; and
    causing the one or more suggested content items to be displayed in the composition interface.

15. The method of claim 13, wherein the one or more properties of the message include:
a parent message, at least one keyword from the message being composed, at least one recipient of the message, an account being used to generate the message, a human-readable language in which the message is composed, a change of the geographical location of the user, or calendar data of the user.

16. The method of claim 13, wherein the one or more suggested content items is a modification of the one or more inputs indicating at least a portion of the intended content of the message.

17. The method of claim 13, wherein adding the suggested content item in the message is conducted automatically.

18. A non-transitory machine-readable medium storing instructions which, when executed by one or more processors, cause the one or more processors to perform operations comprising:
determining a context of a message that a user is composing via a composition interface based on one or more properties of the message, the one or more properties including a geographical location of the user composing the message;
identifying one or more inputs to the composition interface, the one or more inputs indicating in part the geographical location of the user composing the message, the context of the message being determined further based on the one or more inputs at least a portion of intended content of the message;
examining one or more prior messages composed by the user to determine proficiency of the user in a human-readable language;
retrieving, based on the determined proficiency, one or more suggested content items in the human-readable language from a dictionary including a table that links the one or more inputs to the one or more suggested content items, the dictionary being indexed by context and the retrieving including matching the context of the message to a context indexed in the dictionary;
causing display of one or more suggested content items for inclusion in the message based on the context of the message, the suggested content items being phrases related to the geographical location of the user composing the message and the one or more inputs; and
adding a phrase related to the geographical location of the user in the message based at least in part on the one or more properties of the message.

* * * * *